US012416938B2

(12) United States Patent
Yan et al.

(10) Patent No.: US 12,416,938 B2
(45) Date of Patent: Sep. 16, 2025

(54) APPARATUS, SYSTEMS, AND METHODS FOR INTELLIGENT TUNING OF OVERCLOCKING FREQUENCY

(71) Applicant: Intel Corporation, Santa Clara, CA (US)

(72) Inventors: Jin Yan, Santa Clara, CA (US); Hui Xiong, Portland, OR (US); Jianfang Zhu, Portland, OR (US); Felipe Gonzalez, Folsom, CA (US); Mark MacDonald, Beaverton, OR (US); Daniel Ragland, Sherwood, OR (US); Rodny Rodriguez, Beaverton, OR (US); Matthew Fife, Portland, OR (US); Yifan Li, Beaverton, OR (US); Kristoffer Fleming, Chandler, AZ (US)

(73) Assignee: Intel Corporation, Santa Clara, CA (US)

(*) Notice: Subject to any disclaimer, the term of this patent is extended or adjusted under 35 U.S.C. 154(b) by 664 days.

(21) Appl. No.: 17/558,118

(22) Filed: Dec. 21, 2021

(65) Prior Publication Data

US 2022/0113757 A1    Apr. 14, 2022

(51) Int. Cl.
*G06F 1/08* (2006.01)
*G06F 1/20* (2006.01)

(52) U.S. Cl.
CPC ............... *G06F 1/08* (2013.01); *G06F 1/206* (2013.01)

(58) Field of Classification Search
CPC .................................. G06F 1/08; G06F 1/206
See application file for complete search history.

(56) References Cited

U.S. PATENT DOCUMENTS

| 7,382,366 B1* | 6/2008 | Klock | G06F 11/24 |
| | | | 714/E11.154 |
| 2010/0146322 A1* | 6/2010 | Chien | G06F 1/08 |
| | | | 713/600 |
| 2018/0293291 A1* | 10/2018 | Pawar | G06F 1/12 |
| 2021/0109562 A1 | 4/2021 | Ragland et al. | |

(Continued)

OTHER PUBLICATIONS

Intel, "Intel® Performance Maximizer Overclock Software," https://www.intel.com/content/www/us/en/products/docs/processors/core/performance-maximizer.html, retrieved Jun. 14, 2022, 4 pages.

(Continued)

*Primary Examiner* — Zahid Choudhury
(74) *Attorney, Agent, or Firm* — Hanley, Flight & Zimmerman, LLC

(57) ABSTRACT

Apparatus, systems, and methods for intelligent tuning of overclocking frequency are disclosed. An example apparatus includes trial control circuitry to execute an optimization model to select first values for overclocking parameters of a processor, the first values associated with a first trial, and perform benchmark testing of the processor when the processor is operating based on the first values; trial evaluation circuitry to calculate a first score for the first trial based on the benchmark testing; and model updating circuitry to perform a comparison of the first score to a second score, the second score associated with a second trial for second values for the overclocking parameters, the second values different than the first values; and select one of the first values or the second values to overclock the processor based on the comparison.

20 Claims, 8 Drawing Sheets

(56) References Cited

U.S. PATENT DOCUMENTS

2021/0326232 A1\* 10/2021 Partiwala ............ G06F 11/3062
2021/0365269 A1\* 11/2021 Han ........................ G06F 11/24
2021/0405112 A1\* 12/2021 Partiwala ............ G06F 11/0754
2023/0418622 A1\* 12/2023 Zhu ........................ G06N 20/00

OTHER PUBLICATIONS

Intel, "Intel® Cryo Cooling Technology for Intelligent Sub-Ambient Cooling, " retrieved from https://web.archive.org/web/20210408160759/www.intel.com/content/www/us/en/products/docs/processors/core/cryo-cooling.html on Aug. 5, 2022, 4 pages.

Intel, "Intel® Extreme Tuning Utility (Intel® XTU)," https://www.intel.com/content/www/us/en/download/17881/intel-extreme-tuning-utility-intel-xtu.html, Mar. 23, 2022, 2 pages.

Intel, "Overclock Your CPU with Unlocked Intel® Processors," https://www.intel.com/content/www/us/en/gaming/overclocking-intel-processors.html, retrieved Jun. 14, 2022, 9 pages.

Harding, Scharon, "What Is Intel Thermal Velocity Boost? CPUs With TVB Explained," Tom's Hardware, https://www.tomshardware.com/features/intel-thermal-velocity-boost-glossary-definition-tvb, Jun. 29, 2020, 13 pages.

\* cited by examiner

APPARATUS, SYSTEMS, AND METHODS FOR INTELLIGENT TUNING OF OVERCLOCKING FREQUENCY

FIELD OF THE DISCLOSURE

This disclosure relates generally to processors and, more particularly, to apparatus, systems, and methods for intelligent tuning of overclocking frequency.

BACKGROUND

A processing unit such as a central processing unit (CPU) operates according to a clock rate (also referred to as clock speed). The clock rate is a measure of how many clock cycles (e.g., pulses) the processing unit can perform per second. The clock cycle is used to synchronize operation of components of the processing unit. Faster clock cycles can result in faster performance by the processing unit with respect to executing operations and/or instructions for workloads.

BRIEF DESCRIPTION OF THE DRAWINGS

In general, the same reference numbers will be used throughout the drawing(s) and accompanying written description to refer to the same or like parts. The figures are not to scale.

Figure 1:
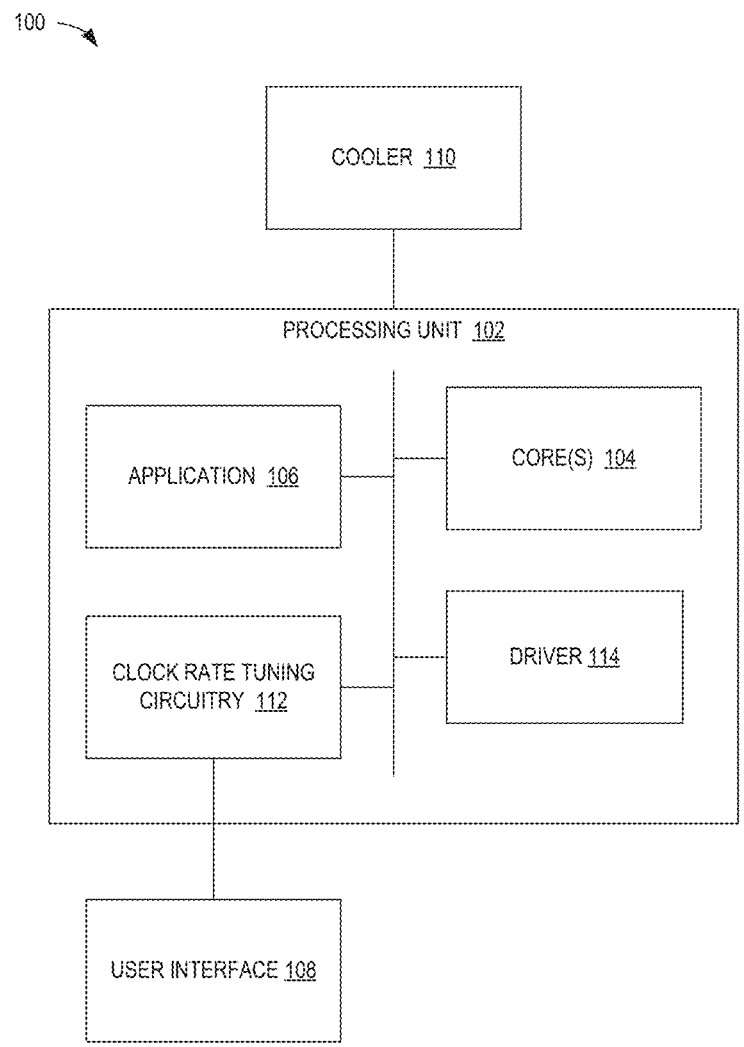
FIG. 1 illustrates an example system constructed in accordance with teachings of this disclosure and including a processing unit, a cooler, and clock rate tuning circuitry to control a clock rate of the processing unit in accordance with teachings of this disclosure.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmed with instructions to perform specific operations and including one or more semiconductor-based logic devices (e.g., electrical hardware implemented by one or more transistors). Examples of processor circuitry include programmed microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of the processing circuitry is/are best suited to execute the computing task(s).

DETAILED DESCRIPTION

A processing unit (e.g., a central processing unit (CPU), a graphical processing unit (GPU), etc.) of an electronic device includes circuitry that executes instructions and/or operations associated with program(s) and/or workload(s). The processing unit can include one or more processor cores to execute the instructions and/or operations by accessing data from main memory of the device. The speed at which the processor cores execute the instructions and/or operations defines a clock rate, or a clock speed, of the processing unit. Generally, the faster the clock rate, the faster the processing unit executes the instructions and/or operations.

Although a faster clock rate can increase performance of the processing unit, an increase in the clock rate can also increase a temperature of the processing unit. To prevent overheating of and/or damage to the processing unit and/or other components of the electronic device, the processing unit can operate based on a preset clock rate defined by, for instance, manufacturer settings. In some instances, a user of the electronic device may overclock the processing unit, or increase the clock rate of the processing unit to a rate that is higher than the preset clock rate, in an effort to increase performance of the processing unit (e.g., to obtain increased computation speeds). In such instances, the user may manually tune or adjust parameters associated with the processing unit, such as voltage, in an effort to increase the clock rate. However, the increased temperature of processing unit during overclocking (e.g., due to increased voltage) can cause the processing unit to become unstable and, in some instances, may cause the processing unit to crash.

Overclocking is typically performed on a trial-and-error basis, where the user adjusts parameters to increase the clock rate until the processing unit becomes unstable. However, the manual trial-and-error approach is limited with respect to optimizing performance of the processing unit. For instance, the manual trial-and-error approach can result in limited increase in the performance of the processing unit due to user bias and/or inexperience in adjusting parameters.

Disclosed herein are example systems, apparatus, and methods that provide for automatic selection of overclocking parameter values (e.g., core voltage, core ratio, temperature threshold, etc.) to increase a clock rate of a processing unit, where the parameter values are identified based on a machine-learning algorithm and account for feedback from components such as a cooler. Examples disclosed herein perform trials in which a set of overclocking parameter values is selected by an optimization model for each trial, where the selected parameter values are expected (based on training of the optimization model) to be optimal parameters for overclocking the processing unit. For each trial, examples disclosed herein perform benchmark testing of the processing unit while the processing unit is operating at the selected overclocking parameter values for the trial. Examples disclosed herein generate a score for each trial that represents performance of the processing unit with the trial overclocking parameter values. The trial scores are used to identify the optimal overclocking parameter values that provide for the greatest increase of the clock rate of the processing unit while maintaining or promoting stability of the processing unit. Examples disclosed herein apply penalties to the trials that are associated with overclocking parameter values that cause the processing unit to become unstable during the benchmark testing, increase a temperature of the processing unit beyond a threshold, etc. As a result of the penalties, the optimization model is trained to select overclocking parameter values that minimize instances in which the processing unit becomes unstable during overclocking. Examples disclosed herein output the optimal values to adjust to overclock the processing unit and, thus, eliminate the use of trial and error by a user in attempting to overclock the unit and/or dependencies on particular workloads being executed by the processing unit when attempting to increase the clock rate.

FIG. 1 illustrates an example system 100 constructed in accordance with teachings of this disclosure for controlling overclocking of a processing unit 102. The example processing unit 102 of FIG. 1 may be any type of processing unit (e.g., a CPU, a GPU, an accelerated processing unit (APU), etc.). For example, the processing unit 102 may be an embedded system, a field programmable gate array, a shared-memory controller, a network on-chip, a networked system, and/or any other circuitry that includes a hardware (e.g., semiconductor-based) processor, memory, and/or cache.

The example processing unit 102 of FIG. 1 includes one or more cores 104. The example processing unit 102 utilizes processing resources (e.g., logic circuitry of the example processor core(s) 104) to execute instructions to implement an application 106. The example processing unit 102 receives user input(s) via a user interface 108.

The example processor core(s) 104 of FIG. 1 execute instructions (e.g., a workload) from the example application 106 (e.g., by reading or writing data). The processing unit 102 may enable one or more of the core(s) 104 to execute the instruction(s). For instance, the application 106 uses resources of the core(s) 104 to execute instructions to perform one or more tasks (e.g., computation phases).

The example processor core(s) 104 execute the instructions at a rate corresponding to a clock rate of the processing unit 102. The clock rate can be a preset clock rate defined based on, for example manufacturer settings for the processing unit 102. In some examples, the processing unit 102 includes a single clock according to which all the cores(s) 104 operate. In other example, the processing unit 102 includes two or more clocks (e.g., one clock for each core 104).

In the example of FIG. 1, a cooler 110 is operatively coupled to the processing unit 102 to reduce a temperature of the processing unit 102 during execution of the workload(s) to prevent the processing unit 102 from overheating. The example cooler 110 of FIG. 1 can be a cryocooler. As disclosed herein, the example cooler 110 generates and outputs performance metrics associated with cooling of the processing unit 102, such as power consumption of the cooler 110, thermistor readings, dew point, revolutions per minute (RPM) of a fan of the cooler 110, etc.

The example processing unit 102 of FIG. 1 can be overclocked to increase the clock rate of the processing unit 102. Put another way, when the processing unit 102 is overclocked, one or more of the cores 104 operate at a clock rate that is higher than the preset clock rate for the processing unit 102. The example processing unit 102 of FIG. 1 includes clock rate tuning circuitry 112 to determine (e.g., optimize, predict, estimate, identify) values of parameters of the processing unit 102 that should be adjusted to provide for overclocking, or an increase the clock rate of the processing unit 102. In particular, in response to a request to overclock the processing unit 102 (e.g., a user input via the user interface 108), the clock rate tuning circuitry 112 determines parameter values such as core voltage and temperature threshold to overclock the processing unit 102 using an optimization model and based on feedback from, for instance, the cooler 110.

In response to a request for overclocking, the clock rate tuning circuitry 112 performs an overclocking tuning experiment to identify the optimal overclocking parameter values to increase the clock rate of the processing unit 102 while maintaining stability of the processing unit 102. The overclocking parameters that are optimized by the clock rate tuning circuitry 112 can include, for instance, a voltage supplied to the core(s), a power limit for the processing unit 102, a current limit for the processing unit 102, turbo ratio limits for the core(s) 104, and/or per core ratio limit. For each overclocking experiment, the clock rate tuning circuitry 112 performs multiple trials to identify optimal parameter values for overclocking the processing unit 102.

To initiate an overclocking trial experiment, a user provides inputs with respect to: (a) minimum and maximum values of the overclocking parameters for the processing unit 102 (e.g., core ratio, core voltage, current limit, etc.) that are to be used in the experiment; (b) a tuning budget, which can include a maximum number of trials to be performed in the experiment or a maximum duration of time for which the experiment should be performed; and (c) a benchmark, or a type of benchmark testing that is to be performed to evaluate the performance of the processing unit 102 when operating based on the parameters values selected by the optimization model. In particular, benchmark scores generated as a result of the testing are used by the clock rate tuning circuitry 112 as an optimization objective to identify the optimal values of the overclocking parameters to overclock the processing unit 102. In other examples, the minimum and maximum values are default settings previously stored in a database rather than selected by the user.

The overclocking experiment performed by the clock rate tuning circuitry 112 includes multiple trials in which different parameter values identified by the optimization model are evaluated to identify the optimal values to overclock the processing unit 102. To perform a new trial of the experiment, the clock rate tuning circuitry 112 executes the optimization model to identify or select a set of values for the overclocking parameters of the processing unit 102 within the range(s) defined by the user input(s) and/or the default settings. For instance, for each trial of the experiment, the clock rate tuning circuitry 112 executes the optimization model to select a core voltage value for the processing unit 102 that is within the minimum and maximum core voltage range defined by the user input(s) and that is expected to be an optimal core voltage value based on the training (i.e., current training) of the optimization model. Similarly, as a result of execution of the optimization model, the clock rate tuning circuitry 112 selects trial values for other parameters such as temperature threshold, core ratio, etc. that are within the minimum and maximum range defined for each parameter and are expected to be optimal overclocking parameter values based on the training of the optimization model. The clock rate tuning circuitry 112 provides the trial values for the overclocking parameters to a driver 114 to cause the processing unit 102 to operate based on the trial overclocking parameter values.

When the trial values of the overclocking parameters are implemented at the processing unit 102, the clock rate tuning circuitry 112 identifies an operational status of the cooler 110 and a temperature of the processing unit 102 prior to performing benchmark testing. As disclosed herein, the cooler 110 outputs cooler performance metric(s) (e.g., cooler power consumption, thermistor readings), which can be indicative of performance of the processing unit 102. In the example of FIG. 1, the performance metrics from the cooler 110 are analyzed by the clock rate tuning circuitry 112. In particular, the clock rate tuning circuitry 112 generates instruction(s) to control the cooler 110 based on the performance metric(s) to facilitate the overclocking tuning trial(s). For example, if the clock rate tuning circuitry 112 determines that the cooler 110 is not currently running, the clock rate tuning circuitry 112 generates and transmits instructions to cause the cooler 110 to operate during the overclocking trial due to the expected increase the temperature of the processing unit 102. Alternatively, if the clock rate tuning circuitry 112 determines, based on the performance of the cooler 110, that the temperature of the processing unit 102 when the trial overclocking parameter values are set at the processing unit 102 exceeds a temperature threshold, the clock rate tuning circuitry 112 generates instructions to cause the cooler 110 to increase cooling of the processing unit 102 before performing the overclocking trial.

After verifying that the cooler 110 is running and a temperature of the processing unit 102 satisfies a temperature threshold (e.g., the temperature is sufficiently low), the clock rate tuning circuitry 112 causes the processing unit 102 to perform benchmark tests or workloads while operating based on the trial overclocking parameter values selected by the clock rate tuning circuitry 112 for the trial. In some examples, the clock rate tuning circuitry 112 causes the benchmarks to be run repeatedly for a trial to evaluate the parameter values selected by the optimization model for the trial (e.g., three benchmark runs).

A benchmark score is generated as a result of each benchmark run. In the example of FIG. 1, the clock rate tuning circuitry 112 determines a trial score for the trial. When determining the trial score for a trial, the clock rate tuning circuitry 112 penalizes the trials in which the overclocking parameters selected for that trial caused the processing unit 102 to become unstable (e.g., crash during the benchmark testing). As disclosed herein, in such examples, the clock rate tuning circuitry 112 weighs the benchmark scores for the trial against the number of successful benchmark runs (e.g., benchmark runs in which the processing unit 102 did not crash).

Upon completion of a trial (e.g., three benchmark runs with the processing unit 102 operating under selected overclocking parameters for the trial), the clock rate tuning circuitry 112 provides the trial score and selected overclocking parameters for the trial to the optimization model. Based on the trial scores generated for each trial in an experiment, the optimization model learns which overclocking parameter values and/or combinations of overclocking parameter values resulted in the highest benchmark scores, which overclocking parameter values and/or combinations of overclocking parameter values caused the processing unit to become unstable, etc. Thus, the optimization model is trained over time to select values for the overclocking parameters for subsequent trials of an experiment based on the results of previous trials in the experiment and/or previously completed experiments. For instance, for a subsequent trial of an experiment, the optimization model can select value(s) of the overclocking parameter(s) and/or combination of the parameter value(s) that are different than the overclocking values that cause the processing unit 102 to crash during one of the previous trials of the experiment.

In the example of FIG. 1, upon completion of an overclocking experiment (i.e., when the tuning budget has been satisfied), the clock rate tuning circuitry 112 outputs the values of the overclocking parameters for the processing unit 102 that are associated with the highest trial score obtained during the experiment. Put another way, the clock rate tuning circuitry 112 outputs the optimal values of the overclocking parameters (e.g., voltage, temperature threshold, core ratio, etc.) for the processing unit 102 as determined from the experiment to increase the clock rate of processing unit 102 while maintaining or promoting stability of the processing unit 102. In some examples, the clock rate tuning circuitry 112 causes the optimal values of the overclocking parameters to be presented to the user via the user interface 108 to enable the user to choose whether to implement the values. In other examples, the clock rate tuning circuitry 112 causes the processing unit 102 to automatically implement the optimal parameters (e.g., by providing the value(s) to the driver 114).

Figure 2:
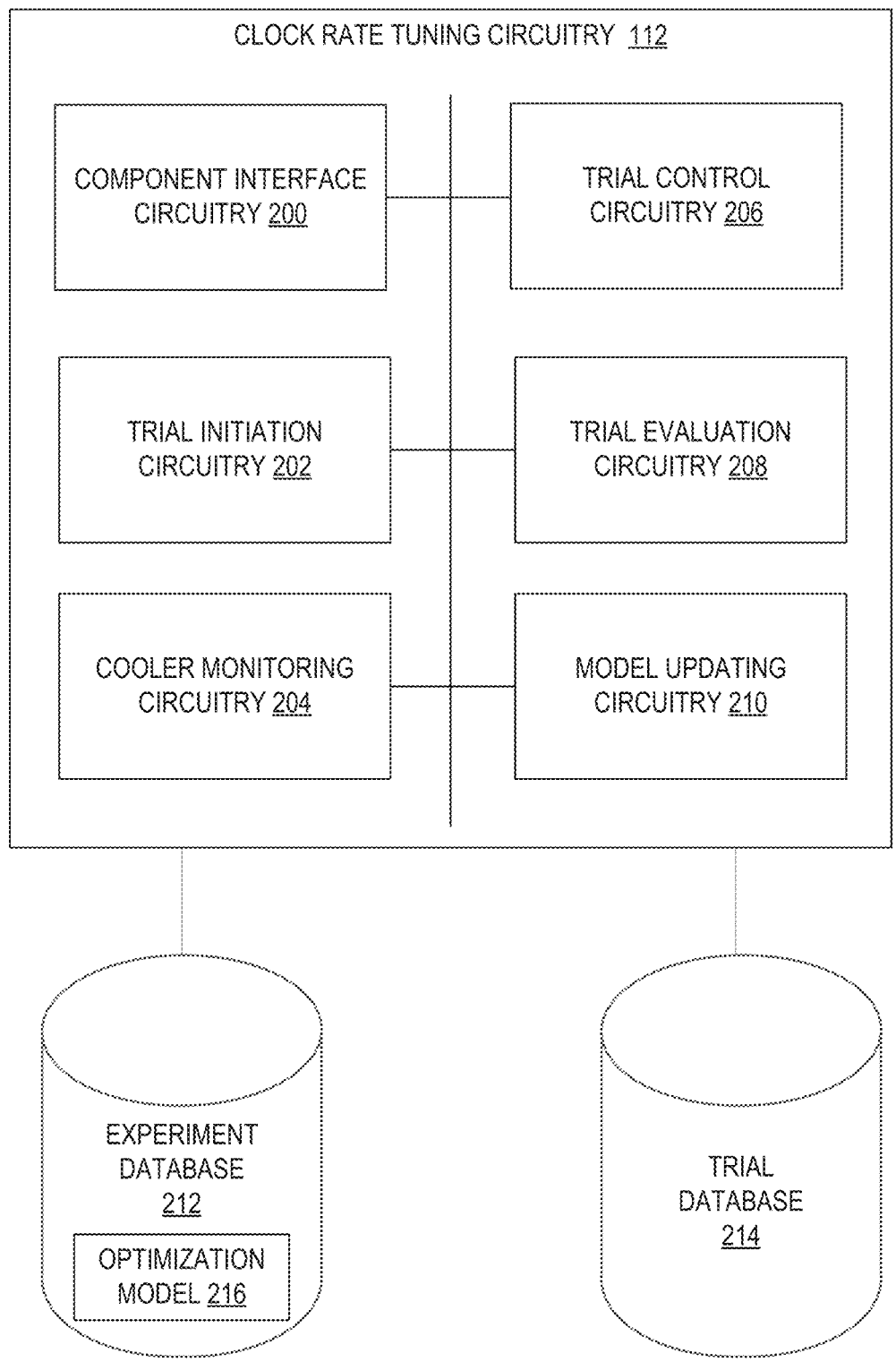
FIG. 2 is a block diagram of an example implementation of the clock rate tuning circuitry of FIG. 1.

FIG. 2 is a block diagram of the clock rate tuning circuitry 112 of FIG. 1 to optimize overclocking parameters of the processing unit 102 of FIG. 1 to increase the clock rate or clock speed of the processing unit 102. The clock rate tuning circuitry 112 of FIG. 2 may be instantiated (e.g., creating an instance of, bring into being for any length of time, materialize, implement, etc.) by processor circuitry such as a central processing unit executing instructions. Additionally or alternatively, the clock rate tuning circuitry 112 of FIG. 2 may be instantiated (e.g., creating an instance of, bring into being for any length of time, materialize, implement, etc.) by an ASIC or an FPGA structured to perform operations corresponding to the instructions. It should be understood that some or all of the circuitry of FIG. 2 may, thus, be instantiated at the same or different times. Some or all of the circuitry may be instantiated, for example, in one or more threads executing concurrently on hardware and/or in series on hardware. Moreover, in some examples, some or all of the circuitry of FIG. 2 may be implemented by one or more virtual machines and/or containers executing on the microprocessor.

The example clock rate tuning circuitry 112 of FIG. 2 includes component interface circuitry 200, trial initiation circuitry 202, cooler monitoring circuitry 204, trial control circuitry 206, trial evaluation circuitry 208, and model updating circuitry 210. In some examples, the trial clock rate tuning circuitry 112 includes an experiment database 212 and a trial database 214. In other examples, the experiment database 212 and/or the trial database 214 are located external to the clock rate tuning circuitry 112 in a location accessible to the clock rate tuning circuitry 112 as shown in FIG. 2. In some examples, the experiment database 212 and the trial database 214 are the same database.

The experiment database 212 stores an optimization algorithm or model 216 to be used by the clock rate tuning circuitry 112 in performing the overclocking analysis. As disclosed herein, the optimization model 216 (e.g., a Tree-Structured Parzen Estimator algorithm) is trained using data (e.g., trial score(s), associated trial overclocking parameter value(s)) generated as a result of execution of the trials and experiments.

The example component interface circuitry 200 of FIG. 2 transmits and/or obtains data from other components. For example, the component interface circuitry 200 transmits prompts to the user interface 108 and retrieves user input(s) from the user interface 108. The component interface circuitry 200 interfaces with the cooler 110 to obtain data regarding the operational status of the cooler 110, temperature data, etc. The component interface circuitry 200 interfaces with the driver 114 to transmit the values of the overclocking parameters selected for a trial and to receive the current overclocking parameter values associated with the processing unit 102 to confirm the trial values were correctly set.

In response to a user request for overclocking of the processing unit 102, the trial initiation circuitry 202 causes a new experiment to be created in the experiment database 212. Each experiment inserted in the experiment database 212 can include data such as a date of the experiment; an experiment identifier assigned to the experiment by the trial initiation circuitry 202; information about a version of the optimization model 216 to be used for the experiment (e.g., a current version of the optimization model 216); the tuning budget for the experiment (a maximum number of trials to be performed in the experiment or a maximum duration of time for which the experiment should be performed); and the minimum and maximum values for each overclocking parameter (e.g., core voltage, temperature threshold) as defined by the user inputs. As disclosed herein, the experiment data in the experiment database 212 is accessed by the trial control circuitry 206 when performing trials of the experiment and/or to resume an experiment if the processing unit 102 crashes during a trial.

Also, in response to the user request for overclocking of the processing unit 102, the trial initiation circuitry 202 causes a new trial to be created in the trial database 214. Each trial inserted in the trial database includes data such as a date of the trial; a trial identifier assigned to the trial by the trial initiation circuitry 202; a temperature of the processing unit 102 prior to performance of the trial (based on data from the cooler 110). During execution of the trial, data generated as part of the trial is saved to the trial in the trial database. For example, the values of the overclocking parameters selected for the trial by the optimization model 216 and a score associated with the trial are saved to the trial in the trial database 214.

The cooler monitoring circuitry 204 analyzes data from the cooler 110 to determine performance of the cooler 110, which can be indicative of performance of the processing unit 102 and the amount of heat generated during overclocking. For instance, the cooler monitoring circuitry 204 can analyze data from the cooler 110 to determine an operational status of the cooler 110 and a temperature of the processing unit 102 (e.g., based thermistor readings provided by the cooler 110). Based on the analysis of the performance metrics from the cooler 110, the cooler monitoring circuitry 204 can generate instructions to cause performance of the cooler 110 to be adjusted to reduce a risk of the processing unit 102 overheating during the overclocking experiment. For instance, if the cooler monitoring circuitry 204 determines that the cooler 110 is not currently running, the cooler monitoring circuitry 204 can generate instructions to cause the cooler 110 to operate before performing the overclocking experiment. In some examples, the cooler monitoring circuitry 204 generates instructions to cause the cooler 110 to increase cooling of the processing unit 102 prior to performing the overclocking experiment if the cooler monitoring circuitry 204 determines that a temperature of the processing unit 102 exceeds a temperature threshold. The temperature threshold for performing benchmark testing at the processing unit 102 provides for benchmark testing under consistent thermal conditions across trials of the experiment. The temperature threshold can be defined based on user inputs and stored in the experiment database 212.

The example trial control circuitry 206 controls execution of the trials of the experiment. For each trial, the trial control circuitry 206 executes the optimization model 216 to select (e.g., estimate, predict, identify) values for the overclocking parameters of the processing unit 102 to evaluated with respect to increasing a clock rate of the processing unit (e.g., a set of parameter values for each trial). The optimization model 216 selects the values based on the parameter ranges defined by the user for each parameter and stored in the experiment database 212. The trial control circuitry 206 stores the selected overclocking parameters in the trial database 214 for the current trial.

The component interface circuitry 200 causes the selected trial values of the overclocking parameters to be transmitted to the driver 114 for implementation at the processing unit 102. The trial control circuitry 206 verifies that the correct overclocking parameters have been set at the processing unit based on data retrieved from the driver 114 via the component interface circuitry 200.

In response to verification of the overclocking parameters at the processing unit 102 and an indication from the cooler monitoring circuitry 204 that the temperature of the processing unit 102 satisfies a temperature threshold for initiating overclocking, the trial control circuitry 206 causes benchmark testing of the processing unit 102 to be performed while the processing unit 102 is operating under the selected trial overclocking parameter values. In particular, the trial control circuitry 206 causes the processing unit 102 to run benchmarking program(s), operation(s), or workload(s) to assess the performance (e.g., stability) of the processing unit 102 when the processing unit 102 is operating under the trial overclocking parameter values. The trial control circuitry 206 causes the benchmark runs to be performed multiple times to assess the performance of the processing unit 102 under the trial overclocking parameter values. For instance, the trial control circuitry 206 can cause three benchmark runs to be performed per trial.

The example trial evaluation circuitry 208 evaluates the stability of the processing unit 102 during each of the benchmark runs and determines a score for the trial based on the performance of the processing unit 102 during the benchmarking. A benchmark score is generated as a result of each benchmark run and saved in the trial database 214. The trial evaluation circuitry 208 determines a score for the trial based on the benchmark runs (e.g., the execution benchmarking program(s), operation(s), or workload(s) by the processing unit 102).

A benchmark run can be considered successful if the processing unit 102 does not crash during the benchmark run while operating based on the selected trial values for the overclocking parameters. If all the benchmark runs in the trial are successful, the trial evaluation circuitry 208 determines the trial score by averaging the scores from each of the benchmark runs. For instance, if three successful benchmark runs are performed, the trial evaluation circuitry 208 determines the trial score as:

Trial Score=(Benchmark Score_1+Benchmark Score_2+ Benchmark Score_3)/x, where x is the number of benchmark runs (e.g., x=3 in this example).

The trial score is saved in the trial database 214 for the particular trial.

If the processing unit 102 becomes unstable during a benchmark run (e.g., due to an increase in temperature of the processing unit 102 while operating under the selected trial parameters), the processing unit 102 crashes and automatically restarts. When a crash event occurs during a benchmark run, the trial evaluation circuitry 208 applies a penalty to the trial score to penalize trials that include overclocking parameters that caused the processing unit 102 to crash. In such examples, the trial evaluation circuitry 208 reads the scores from previously successful benchmark runs saved in the trial database 214 for the trial before the crash. The trial evaluation circuitry 208 calculates the trial score by weighing the number of successful benchmark runs against the benchmark scores. In such examples, the trial evaluation circuitry 208 calculates the trial score as:

Trial Score=Sum of k Successful Benchmark Score(s)/x, where k is the number of successful runs and x is the number of attempted benchmark runs.

Thus, the more successful benchmark runs, the less penalty that is applied to the trial.

As an example, three benchmark runs are attempted for a trial, however, only the first benchmark run was successful and resulted in a benchmark score of 100; the processing unit 102 crashed during the second benchmark run and the third benchmark run. In such examples, the trial evaluation circuitry 208 calculates the trial score as:

Trial Score=(⅓)*(100)=33.333

Thus, the two unsuccessful benchmark runs are treated as penalties when calculating the score for the trial.

The example trial evaluation circuitry 208 can identify a benchmark run as an unsuccessful run based on anomalies with respect to the performance of the processing unit 102 other than crash events. For example, if the trial evaluation circuitry 208 determines that a length of time for the processing unit 102 to perform a benchmark test exceeds a test performance time threshold (e.g., user defined threshold stored in the experiment database 212), the trial evaluation circuitry 208 can flag the benchmark run as a failure. The trial evaluation circuitry 208 applies the penalty to the trial score as if the processing unit 102 had crashed.

In other examples, the trial evaluation circuitry 208 identifies the trial as a failure based on a temperature of the processing unit 102 when the trial overclocking parameter values are set at the processing unit 102 via the driver 114 (FIG. 1). As disclosed herein, the cooler monitoring circuitry 204 can instruct the cooler 110 (FIG. 1) to increase cooling of the processing unit 102 after the trial values are set and prior to execution of the benchmark runs if a temperature of the processing unit 102 exceeds a temperature threshold. In some examples, despite increased cooling provided by the cooler 110, the temperature of the processing unit 102 does not decrease below the temperature threshold within a threshold period of time. In such cases, the trial evaluation circuitry 208 identifies the trial as a failure because the values of the overclocking parameters selected by the optimization model 216 for the trial caused the temperature of the processing unit 102 to increase beyond an allowable threshold for performing overclocking.

In some examples, the trial evaluation circuitry 208 considers performance metrics output by the cooler 110 during the benchmark runs with respect to determining a success of the benchmark run and/or the trial. For example, if the cooler monitoring circuitry 204 determines that the RPM of the cooler fan exceeds a user-defined RPM threshold during a benchmark run (thereby indicating that excess heat was generated during the benchmark run), the trial evaluation circuitry 208 can identify the benchmark run as a failure and penalize the trial score.

The model updating circuitry 210 updates the optimization model 216 based on the trial score from each trial of an experiment. In particular, the model updating circuitry 210 reports the trial score for a trial and the associated values of the overclocking parameters used for the trial. The trial score and the associated values of the overclocking parameters for each trial serve as training data for the optimization model. For example, the optimization model can differentiate trials that resulted in the processing unit 102 crashing during one or more of the benchmark runs from trials in which the processing unit 102 remained stable during the runs based on the respective trials scores. As a result, the optimization model 216 learns to avoid selecting the overclocking parameter values and/or combinations of the overclocking parameter values that caused the processing unit 102 to crash.

The trial control circuitry 206 continues to cause trials to be performed until the number of trials performed and/or the duration of time for the experiment satisfies the tuning budget for the experiment. For each trial of an experiment, the trial control circuitry 206 executes the optimization model to select trial values for the overclocking parameters and performs the benchmark testing. The trial evaluation circuitry 208 determines the scores for the respective trials based on the benchmark scores generated during each trial. The model updating circuitry 210 reports the trial scores and associated overclocking parameter values for training of the optimization model 216.

When the tuning budget is satisfied, the model updating circuitry 210 identifies the highest trial score that was obtained for the experiment and the associated overclocking parameter values (e.g., optimal values for core voltage, core ratio, current limit, etc.) that resulted in the highest trial score. In some examples, the component interface circuitry 200 transmits the trial score and the associated overclocking parameter values for presentation via the user interface 108 (FIG. 1) to enable a user to overclock the processing unit 102 based on the values determined by the optimization experiment. In other examples, the component interface circuitry 200 transmits overclocking parameter values to the driver 114 (FIG. 1) to cause the optimal parameter values to be automatically implemented at the processing unit 102. Thus, in some examples, the clock rate tuning circuitry 112 can be used to automate overclocking of the processing unit 102 based on the overclocking optimization experiment. The optimization model 216 can be further tuned, refined, or otherwise trained based on data generated from subsequent overclocking experiments initiated by the user (e.g., using different minimum/maximum ranges for the overclocking parameters).

In some examples, the apparatus includes means for interfacing. For example, the means for interfacing may be implemented by the component interface circuitry 200. In some examples, the component interface circuitry 200 may be instantiated by processor circuitry such as the example processor circuitry 412 of FIG. 4. For instance, the component interface circuitry 200 may be instantiated by the example general purpose processor circuitry 500 of FIG. 5 executing machine executable instructions such as that implemented by at least blocks 302, 312, 338, and 340 of FIGS. 3A and 3B. In some examples, the component interface circuitry 200 may be instantiated by hardware logic circuitry, which may be implemented by an ASIC or the FPGA circuitry 600 of FIG. 6 structured to perform operations corresponding to the machine readable instructions. Additionally or alternatively, the component interface circuitry 200 may be instantiated by any other combination of hardware, software, and/or firmware. For example, the component interface circuitry 200 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the apparatus includes means for initiating a trial. For example, the means for initiating may be implemented by the trial initiation circuitry 202. In some examples, the trial initiation circuitry 202 may be instantiated by processor circuitry such as the example processor circuitry 412 of FIG. 4. For instance, the trial initiation circuitry 202 may be instantiated by the example general purpose processor circuitry 500 of FIG. 5 executing machine executable instructions such as that implemented by at least blocks 304, 306, 308 of FIGS. 3A and 3B. In some examples, the trial initiation circuitry 202 may be instantiated by hardware logic circuitry, which may be implemented by an ASIC or the FPGA circuitry 600 of FIG. 6 structured to perform operations corresponding to the machine readable instructions. Additionally or alternatively, the trial initiation circuitry 202 may be instantiated by any other combination of hardware, software, and/or firmware. For example, the trial initiation circuitry 202 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the apparatus includes means for monitoring a cooler. For example, the means for monitoring may be implemented by the cooler monitoring circuitry 204. In some examples, the cooler monitoring circuitry 204 may be instantiated by processor circuitry such as the example processor circuitry 412 of FIG. 4. For instance, the cooler monitoring circuitry 204 may be instantiated by the example general purpose processor circuitry 500 of FIG. 5 executing machine executable instructions such as that implemented by at least blocks 314, 316, 318 of FIGS. 3A and 3B. In some examples, the cooler monitoring circuitry 204 may be instantiated by hardware logic circuitry, which may be implemented by an ASIC or the FPGA circuitry 600 of FIG. 6 structured to perform operations corresponding to the machine readable instructions. Additionally or alternatively, the cooler monitoring circuitry 204 may be instantiated by any other combination of hardware, software, and/or firmware. For example, the cooler monitoring circuitry 204 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the apparatus includes means for controlling a trial. For example, the means for controlling may be implemented by the trial control circuitry 206. In some examples, the trial control circuitry 206 may be instantiated by processor circuitry such as the example processor circuitry 412 of FIG. 4. For instance, the trial control circuitry 206 may be instantiated by the example general purpose processor circuitry 500 of FIG. 5 executing machine executable instructions such as that implemented by at least blocks 310, 320, 322 of FIGS. 3A and 3B. In some examples, the trial control circuitry 206 may be instantiated by hardware logic circuitry, which may be implemented by an ASIC or the FPGA circuitry 600 of FIG. 6 structured to perform operations corresponding to the machine readable instructions. Additionally or alternatively, the trial control circuitry 206 may be instantiated by any other combination of hardware, software, and/or firmware. For example, the trial control circuitry 206 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the apparatus includes means for evaluating a trial. For example, the means for evaluating may be implemented by the trial evaluation circuitry 208. In some examples, the trial evaluation circuitry 208 may be instantiated by processor circuitry such as the example processor circuitry 412 of FIG. 4. For instance, the trial evaluation circuitry 208 may be instantiated by the example general purpose processor circuitry 500 of FIG. 5 executing machine executable instructions such as that implemented by at least blocks 324, 326, 328, 330, 332 of FIGS. 3A and 3B. In some examples, the trial evaluation circuitry 208 may be instantiated by hardware logic circuitry, which may be implemented by an ASIC or the FPGA circuitry 600 of FIG. 6 structured to perform operations corresponding to the machine readable instructions. Additionally or alternatively, the trial evaluation circuitry 208 may be instantiated by any other combination of hardware, software, and/or firmware. For example, the trial evaluation circuitry 208 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the apparatus includes means for updating a model. For example, the means for updating may be implemented by the model updating circuitry 210. In some examples, the model updating circuitry 210 may be instantiated by processor circuitry such as the example processor circuitry 412 of FIG. 4. For instance, the model updating circuitry 210 may be instantiated by the example general purpose processor circuitry 500 of FIG. 5 executing machine executable instructions such as that implemented by at least blocks 334, 336 of FIGS. 3A and 3B. In some examples, the model updating circuitry 210 may be instantiated by hardware logic circuitry, which may be implemented by an ASIC or the FPGA circuitry 600 of FIG. 6 structured to perform operations corresponding to the machine readable instructions. Additionally or alternatively, the model updating circuitry 210 may be instantiated by any other combination of hardware, software, and/or firmware. For example, the model updating circuitry 210 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

While an example manner of implementing the clock rate tuning circuitry 112 of FIG. 1 is illustrated in FIG. 2, one or more of the elements, processes, and/or devices illustrated in FIG. 2 may be combined, divided, re-arranged, omitted, eliminated, and/or implemented in any other way. Further, the example component interface circuitry 200, the example trial initiation circuitry 202, the example cooler monitoring circuitry 204, the example trial control circuitry, the example trial evaluation circuitry, the example model updating circuitry 210, and/or, more generally, the example clock rate tuning circuitry 112 of FIGS. 1 and/or 2, may be implemented by hardware alone or by hardware in combination with software and/or firmware. Thus, for example, any of the example component interface circuitry 200, the example trial initiation circuitry 202, the example cooler monitoring circuitry 204, the example trial control circuitry, the example trial evaluation circuitry, the example model updating circuitry 210, and/or, more generally, the example clock rate tuning circuitry 112, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). Further still, the example clock rate tuning circuitry 112 of FIG. 1 may include one or more elements, processes, and/or devices in addition to, or instead of, those illustrated in FIG. 2, and/or may include more than one of any or all of the illustrated elements, processes, and devices.

Figure 3A:
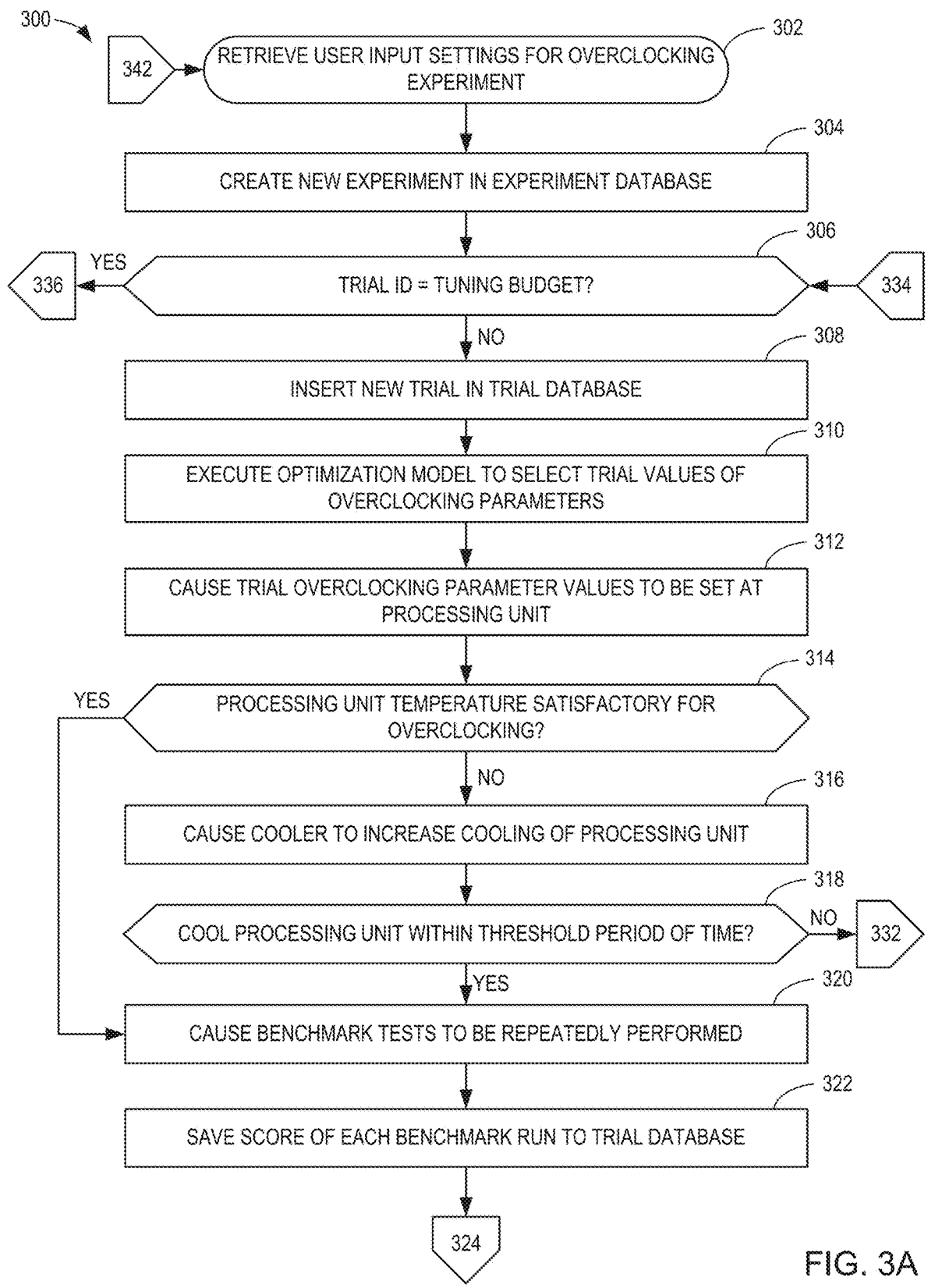
FIGS. 3A and 3B include a flowchart representative of example machine readable instructions and/or example operations that may be executed by example processor circuitry to implement the clock rate tuning circuitry of FIG. 2.
Figure 3B:
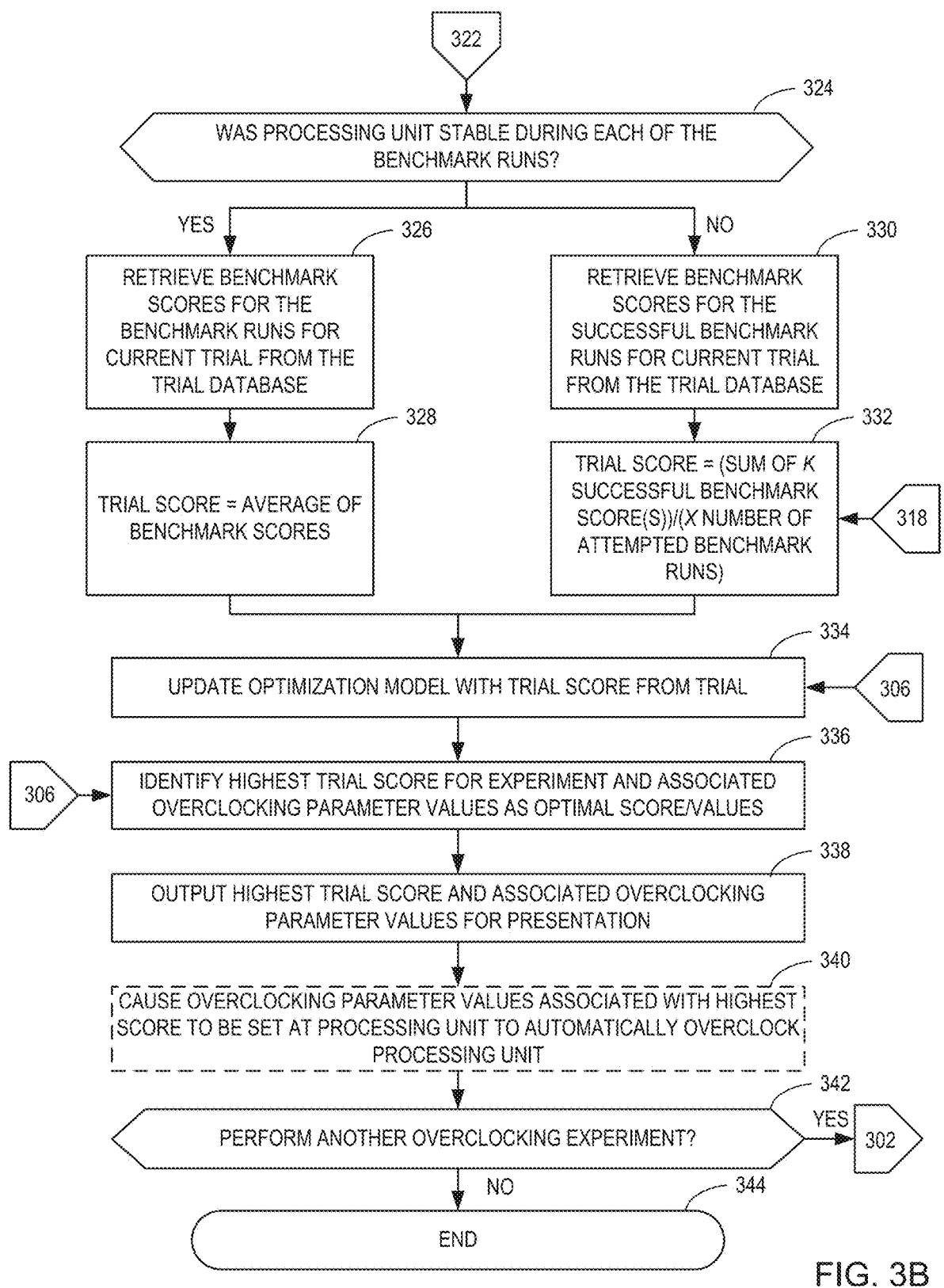

A flowchart representative of example hardware logic circuitry, machine readable instructions, hardware implemented state machines, and/or any combination thereof for implementing the clock rate tuning circuitry of FIG. 2 is shown in FIGS. 3A and 3B. The machine readable instructions may be one or more executable programs or portion(s) of an executable program for execution by processor circuitry, such as the processor circuitry 412 shown in the example processor platform 400 discussed below in connection with FIG. 4 and/or the example processor circuitry discussed below in connection with FIGS. 5 and/or 6. The program may be embodied in software stored on one or more non-transitory computer readable storage media such as a compact disk (CD), a floppy disk, a hard disk drive (HDD), a solid-state drive (SSD), a digital versatile disk (DVD), a Blu-ray disk, a volatile memory (e.g., Random Access Memory (RAM) of any type, etc.), or a non-volatile memory (e.g., electrically erasable programmable read-only memory (EEPROM), FLASH memory, an HDD, an SSD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN)) gateway that may facilitate communication between a server and an endpoint client hardware device). Similarly, the non-transitory computer readable storage media may include one or more mediums located in one or more hardware devices. Further, although the example program is described with reference to the flowchart illustrated in FIGS. 3A and 3B, many other methods of implementing the example clock rate tuning circuitry 112 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU), etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIGS. 3A and 3B may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium and non-transitory computer readable storage medium are expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a," "an," "first," "second," etc.) do not exclude a plurality. The term "a" or "an" object, as used herein, refers to one or more of that object. The terms "a" (or "an"), "one or more," and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

FIGS. 3A and 3B illustrate a flowchart representative of example machine readable instructions and/or example operations 300 that may be executed and/or instantiated by processor circuitry to optimize values of overclocking parameters to adjust a clock rate of the processing unit 102 of FIG. 1. The machine readable instructions and/or the operations 300 of FIGS. 3A and 3B begin at block 302, at which the component interface circuitry 200 retrieves user input settings entered via the user interface 108 for an overclocking experiment. The user input settings can include, for example, minimum and maximum ranges of the overclocking parameter values (e.g., respective minimum and maximum values for core ratio, core voltage, temperature threshold, etc.); the tuning budget (e.g., the number of trials to be performed in the experiment and/or the duration of the experiment); and a type of benchmark testing that is to be performed, where the resulting benchmark scores are to be used as an optimization objective when tuning an optimization model to identify the optimal overclocking parameter values. In other examples, the minimum and maximum values are default values that the component interface circuitry 200 retrieves from the experiment database 212.

At block 304, the trial initiation circuitry 202 creates a new experiment in the experiment database 212 and a new trial in the trial database 214. The experiment saved to the experiment database 212 can include the user input settings for the experiment, the optimization model 216 to be used for the experiment, etc.

At block 306, the trial control circuitry 206 determines whether a trial identifier for a previously run trial indicates that the tuning budget for the experiment has been satisfied. If the tuning budget has not been satisfied, at block 308, the trial initiation circuitry 202 inserts a new trial into the trial database 214 (e.g., trial identifier=trial identifier+1) to save data generated during the trial, such as the selected overclocking values by the optimization model 216 and the benchmark scores generated during the benchmark testing.

At block 310, the trial control circuitry 206 executes the optimization model to select (e.g., determine, estimate, predict) trial values for the overclocking parameters to be used in the trial, where the trial values are selected as the expected optimal values based on the training (i.e., current training) of the optimization model 216. The optimization model 216 selects the values based on the minimum/maximum range(s) for the parameters defined by the user input settings and/or the default settings.

At block 312, the component interface circuitry 200 transmits the trial overclocking parameter values selected by the optimization model 216 to the driver 114 of the processing unit 102 to cause the trial values to be set or implemented at the processing unit 102.

At block 314, the cooler monitoring circuitry 204 analyzes data from the cooler 110 to confirm that the cooler 110 is operating and that the temperature of the processing unit 102 does not exceed a temperature threshold when the trial overclocking parameter values have been set at the processing unit 102. If the cooler monitoring circuitry 204 determines that the temperature of the processing unit 102 should be reduced, the cooler monitoring circuitry 204 instructs the cooler 110 to increase cooling of the processing unit 102 at block 316. If, at block 318, the cooler monitoring circuitry 204 determines that the temperature of the processing unit 102 has not been reduced within a threshold amount of time, the cooler monitoring circuitry 204 identifies the trial as a failure because the selected overclocking parameter values increased the temperature of the processing unit 102 and introduced a risk of overheating. In such instance, control proceeds to block 332, where a penalty is applied to the trial.

When the cooler monitoring circuitry 204 verifies that the temperature of the processing unit 102 satisfies the temperature threshold, at block 320, the trial control circuitry 206 causes benchmark tests to be repeatedly performed for the processing unit 102. For example, the trial control circuitry 206 can cause three benchmark runs to be performed when the processing unit 102 is operating based on the trial overclocking parameter value(s). A benchmark score is obtained for each benchmark run. At block 322, the trial control circuitry 206 saves the benchmark scores to the trial database for the trial.

At block 324, the trial evaluation circuitry 208 determines if the processing unit 102 was stable during each of the benchmark runs. The trial evaluation circuitry 208 adjusts the determination of a score for the trial based on the stability of the processing unit 102 during the benchmark runs.

If the processing unit 102 was stable during each of the benchmark runs (e.g., the processing unit 102 did not crash or experience other anomalies such as a benchmark test exceeding a threshold performance time), the trial evaluation circuitry 208 retrieves the benchmark scores for the trial from the trial database 214 at block 326. At block 328, the trial evaluation circuitry 208 calculates the trial score by averaging the benchmark scores.

If the processing unit 102 was unstable during any of the benchmark runs, at block 330, the trial evaluation circuitry 208 retrieves the benchmark scores for the successful benchmark runs (e.g., benchmark runs that did not cause the processing unit 102 to crash) from the trial database 214. At block 332, the trial evaluation circuitry 208 calculates the trial score by dividing the sum of the benchmark scores for the successful runs by a penalization factor. The penalization factor is defined by the total number of attempted benchmark runs (e.g., three benchmark runs).

At block 334, the model updating circuitry 210 updates or refines the optimization model 216 with the trial score for the trial and the associated overclocking parameter value(s) for that trial. Based on the value of the trial score for the trial and the associated overclocking parameter value(s) for that trial, the optimization model 216 learns which trial overclocking parameter value(s) resulted in successful benchmark runs (as represented by higher trial score(s)) and which trial overclocking parameter value(s) caused the processing unit 102 to become unstable (as represented by lower trial score(s)).

Control returns to block 306 to determine if the tuning budget for the experiment has been satisfied. If the tuning budget for the experiment has not been satisfied, then the trial initiation circuitry 202 initiates a new trial and control proceeds to perform the new trial as disclosed in connection with blocks 308-334.

If the tuning budget for the experiment has been satisfied (i.e., no further trials are to be performed), the model updating circuitry 210 identifies the highest trial score for the experiment and the associated overclocking parameter values that resulted in the highest trial score at block 336. The highest trial score and the associated overclocking parameter values represented the optimal score and the optimal values based on the user input settings for the experiment.

At block 338, the component interface circuitry 200 outputs the highest trial score and the values of the overclocking parameters associated with the trial that generated the highest trial score for presentation via the user interface 108. In some examples, the outputs are provided to the user via the user interface 108 to enable the user to choose whether to implement the overclocking parameter values identified by the experiment and overclock the processing unit 102. In some examples, at block 340, the component interface circuitry 200 transmits the optimal overclocking parameter values to the driver 114 to cause the values to be set at the processing unit 102 to automatically overclock the processing unit based on the results of the experiment.

If, at block 342, another overclocking experiment is to be performed, control returns to block 300, where the component interface circuitry retrieves the user input settings to be used for the additional experiment and the experiment is repeated as disclosed in connection with blocks 302-340. The example instructions 300 of FIGS. 3A and 3B end at block 344 when no further experiments are to be performed.

Figure 4:
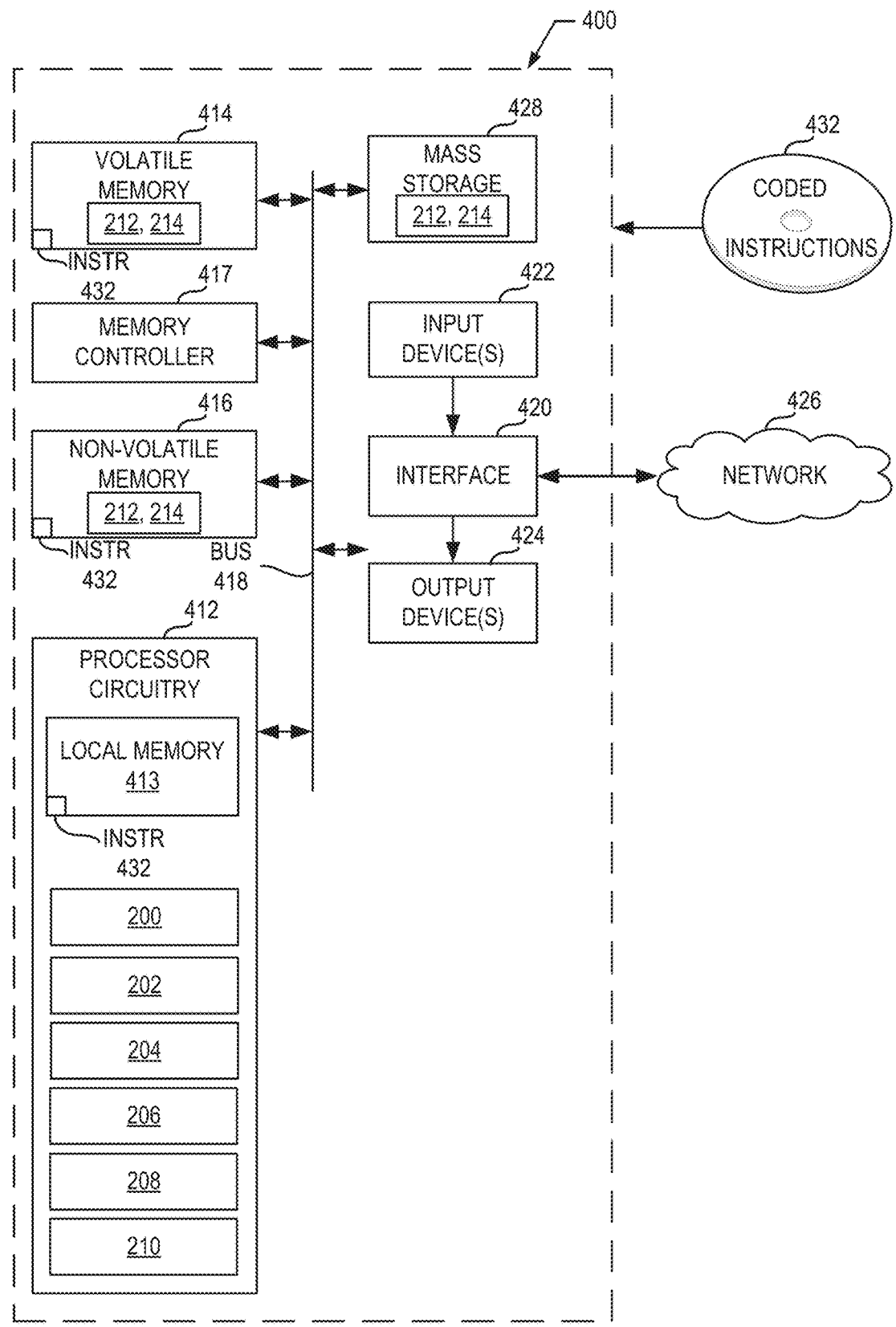
FIG. 4 is a block diagram of an example processing platform including processor circuitry structured to execute the example machine readable instructions and/or the example operations of FIGS. 3A and 3B to implement the clock rate tuning circuitry of FIG. 2.

FIG. 4 is a block diagram of an example processor platform 400 structured to execute and/or instantiate the machine readable instructions and/or the operations of FIGS. 3A and 3B to implement the clock rate tuning circuitry 112 of FIGS. 1 and/or 2. The processor platform 400 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, or any other type of computing device.

The processor platform 400 of the illustrated example includes processor circuitry 412. The processor circuitry 412 of the illustrated example is hardware. For example, the processor circuitry 412 can be implemented by one or more integrated circuits, logic circuits, FPGAs, microprocessors, CPUs, GPUs, DSPs, and/or microcontrollers from any desired family or manufacturer. The processor circuitry 412 may be implemented by one or more semiconductor based (e.g., silicon based) devices. In this example, the processor circuitry 412 implements the example component interface circuitry 200, the example trial initiation circuitry 202, the example cooler monitoring circuitry 204, the example trial control circuitry 206, the example trial evaluation circuitry 208, and the example model updating circuitry 210.

The processor circuitry 412 of the illustrated example includes a local memory 413 (e.g., a cache, registers, etc.). The processor circuitry 412 of the illustrated example is in communication with a main memory including a volatile memory 414 and a non-volatile memory 416 by a bus 418. The volatile memory 414 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 416 may be implemented by flash memory and/or any other desired type of memory device. Access to the main memory 414, 416 of the illustrated example is controlled by a memory controller 417.

The processor platform 400 of the illustrated example also includes interface circuitry 420. The interface circuitry 420 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 422 are connected to the interface circuitry 420. The input device(s) 422 permit(s) a user to enter data and/or commands into the processor circuitry 412. The input device(s) 422 can be implemented by, for example, an audio sensor, a microphone, a camera (still or video), a keyboard, a button, a mouse, a touchscreen, a track-pad, a trackball, an isopoint device, and/or a voice recognition system.

One or more output devices 424 are also connected to the interface circuitry 420 of the illustrated example. The output device(s) 424 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 420 of the illustrated example, thus, typically includes a graphics driver card, a graphics driver chip, and/or graphics processor circuitry such as a GPU.

The interface circuitry 420 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 426. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 400 of the illustrated example also includes one or more mass storage devices 428 to store software and/or data. Examples of such mass storage devices 428 include magnetic storage devices, optical storage devices, floppy disk drives, HDDs, CDs, Blu-ray disk drives, redundant array of independent disks (RAID) systems, solid state storage devices such as flash memory devices and/or SSDs, and DVD drives.

The machine executable instructions 432, which may be implemented by the machine readable instructions of FIGS. 3A and 3B, may be stored in the mass storage device 428, in the volatile memory 414, in the non-volatile memory 416, and/or on a removable non-transitory computer readable storage medium such as a CD or DVD.

Figure 5:
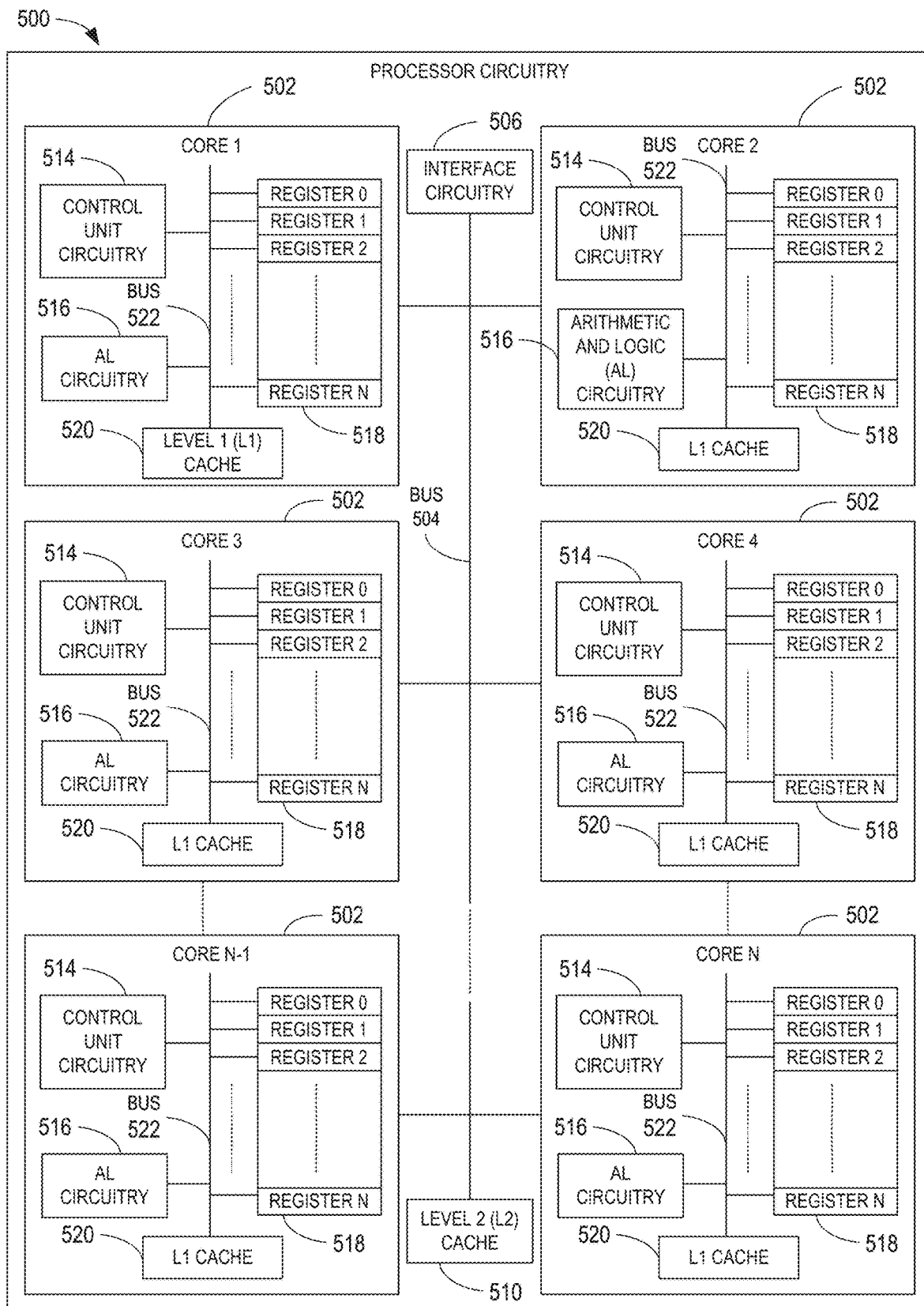
FIG. 5 is a block diagram of an example implementation of the processor circuitry of FIG. 4.

FIG. 5 is a block diagram of an example implementation of the processor circuitry 412 of FIG. 4. In this example, the processor circuitry 412 of FIG. 4 is implemented by a general purpose microprocessor 500. The general purpose microprocessor circuitry 500 executes some or all of the machine readable instructions of the flowchart of FIGS. 3A and 3B to effectively instantiate the clock rate tuning circuitry 112 of FIGS. 1 and/or 2 as logic circuits to perform the operations corresponding to those machine readable instructions. In some such examples, the clock rate tuning circuitry 112 of FIGS. 1 and/or 2 is instantiated by the hardware circuits of the microprocessor 500 in combination with the instructions. For example, the microprocessor 500 may implement multi-core hardware circuitry such as a CPU, a DSP, a GPU, an XPU, etc. Although it may include any number of example cores 502 (e.g., 1 core), the microprocessor 500 of this example is a multi-core semiconductor device including N cores. The cores 502 of the microprocessor 500 may operate independently or may cooperate to execute machine readable instructions. For example, machine code corresponding to a firmware program, an embedded software program, or a software program may be executed by one of the cores 502 or may be executed by multiple ones of the cores 502 at the same or different times. In some examples, the machine code corresponding to the firmware program, the embedded software program, or the software program is split into threads and executed in parallel by two or more of the cores 502. The software program may correspond to a portion or all of the machine readable instructions and/or operations represented by the flowchart of FIGS. 3A and 3B.

The cores 502 may communicate by a first example bus 504. In some examples, the first bus 504 may implement a communication bus to effectuate communication associated with one(s) of the cores 502. For example, the first bus 504 may implement at least one of an Inter-Integrated Circuit (I2C) bus, a Serial Peripheral Interface (SPI) bus, a PCI bus, or a PCIe bus. Additionally or alternatively, the first bus 504 may implement any other type of computing or electrical bus. The cores 502 may obtain data, instructions, and/or signals from one or more external devices by example interface circuitry 506. The cores 502 may output data, instructions, and/or signals to the one or more external devices by the interface circuitry 506. Although the cores 502 of this example include example local memory 520 (e.g., Level 1 (L1) cache that may be split into an L1 data cache and an L1 instruction cache), the microprocessor 500 also includes example shared memory 510 that may be shared by the cores (e.g., Level 2 (L2 cache)) for high-speed access to data and/or instructions. Data and/or instructions may be transferred (e.g., shared) by writing to and/or reading from the shared memory 510. The local memory 520 of each of the cores 502 and the shared memory 510 may be part of a hierarchy of storage devices including multiple levels of cache memory and the main memory (e.g., the main memory 414, 416 of FIG. 4). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 502 may be referred to as a CPU, DSP, GPU, etc., or any other type of hardware circuitry. Each core 502 includes control unit circuitry 514, arithmetic and logic (AL) circuitry (sometimes referred to as an ALU) 516, a plurality of registers 518, the L1 cache 520, and a second example bus 522. Other structures may be present. For example, each core 502 may include vector unit circuitry, single instruction multiple data (SIMD) unit circuitry, load/store unit (LSU) circuitry, branch/jump unit circuitry, floating-point unit (FPU) circuitry, etc. The control unit circuitry 514 includes semiconductor-based circuits structured to control (e.g., coordinate) data movement within the corresponding core 502. The AL circuitry 516 includes semiconductor-based circuits structured to perform one or more mathematic and/or logic operations on the data within the corresponding core 502. The AL circuitry 516 of some examples performs integer based operations. In other examples, the AL circuitry 516 also performs floating point operations. In yet other examples, the AL circuitry 516 may include first AL circuitry that performs integer based operations and second AL circuitry that performs floating point operations. In some examples, the AL circuitry 516 may be referred to as an Arithmetic Logic Unit (ALU). The registers 518 are semiconductor-based structures to store data and/or instructions such as results of one or more of the operations performed by the AL circuitry 516 of the corresponding core 502. For example, the registers 518 may include vector register(s), SIMD register(s), general purpose register(s), flag register(s), segment register(s), machine specific register(s), instruction pointer register(s), control register(s), debug register(s), memory management register(s), machine check register(s), etc. The registers 518 may be arranged in a bank as shown in FIG. 5. Alternatively, the registers 518 may be organized in any other arrangement, format, or structure including distributed throughout the core 502 to shorten access time. The second bus 522 may implement at least one of an I2C bus, a SPI bus, a PCI bus, or a PCIe bus Each core 502 and/or, more generally, the microprocessor 500 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 500 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 6:
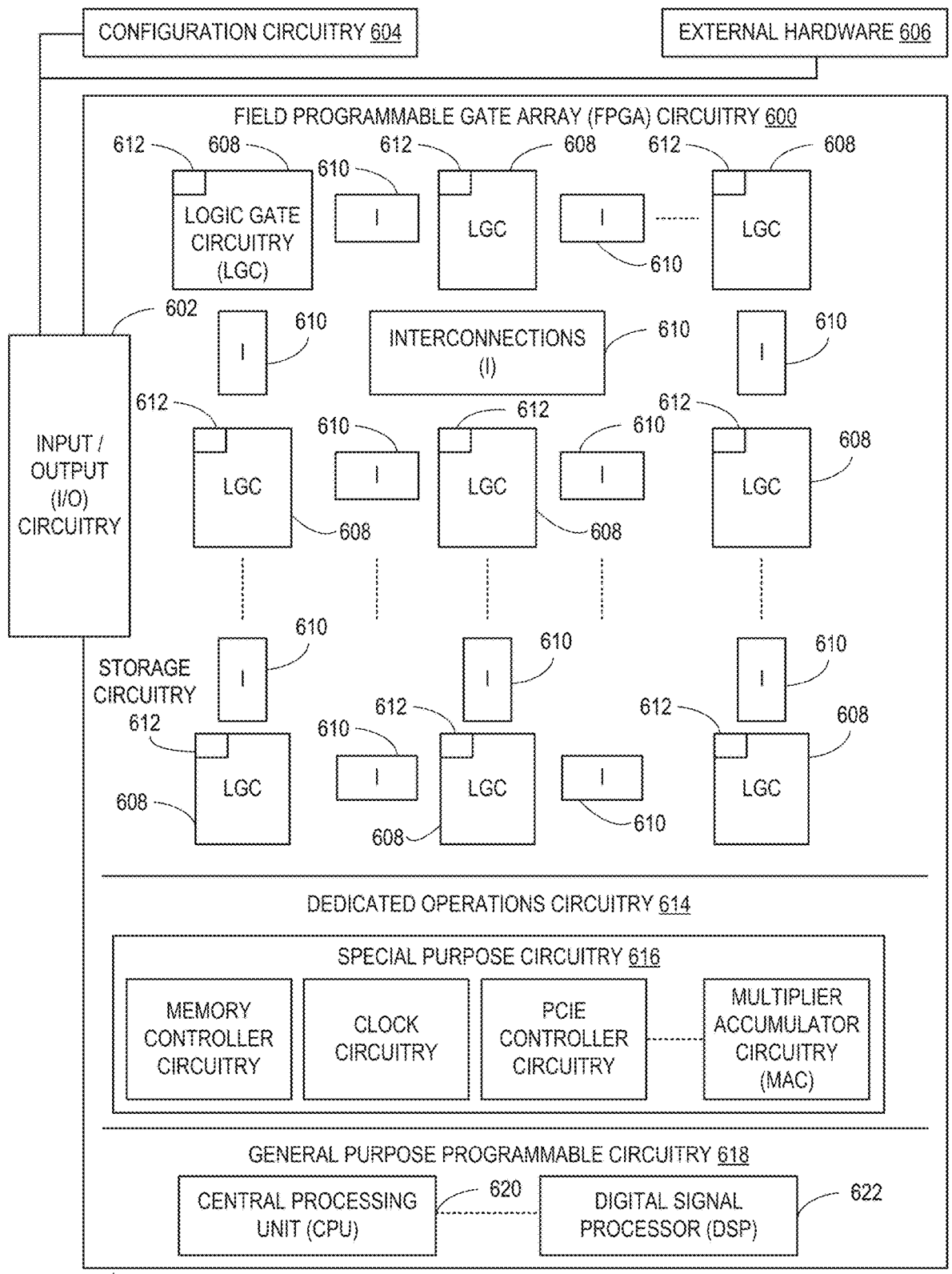
FIG. 6 is a block diagram of another example implementation of the processor circuitry of FIG. 4.

FIG. 6 is a block diagram of another example implementation of the processor circuitry 412 of FIG. 4. In this example, the processor circuitry 412 is implemented by FPGA circuitry 600. The FPGA circuitry 600 can be used, for example, to perform operations that could otherwise be performed by the example microprocessor 500 of FIG. 5 executing corresponding machine readable instructions. However, once configured, the FPGA circuitry 600 instantiates the machine readable instructions in hardware and, thus, can often execute the operations faster than they could be performed by a general purpose microprocessor executing the corresponding software.

More specifically, in contrast to the microprocessor 500 of FIG. 5 described above (which is a general purpose device that may be programmed to execute some or all of the machine readable instructions represented by the flowchart of FIGS. 3A and 3B but whose interconnections and logic circuitry are fixed once fabricated), the FPGA circuitry 600 of the example of FIG. 6 includes interconnections and logic circuitry that may be configured and/or interconnected in different ways after fabrication to instantiate, for example, some or all of the machine readable instructions represented by the flowchart of FIGS. 3A and 3B. In particular, the FPGA 600 may be thought of as an array of logic gates, interconnections, and switches. The switches can be programmed to change how the logic gates are interconnected by the interconnections, effectively forming one or more dedicated logic circuits (unless and until the FPGA circuitry 600 is reprogrammed). The configured logic circuits enable the logic gates to cooperate in different ways to perform different operations on data received by input circuitry. Those operations may correspond to some or all of the software represented by the flowchart of FIGS. 3A and 3B. As such, the FPGA circuitry 600 may be structured to effectively instantiate some or all of the machine readable instructions of the flowchart of FIGS. 3A and 3B as dedicated logic circuits to perform the operations corresponding to those software instructions in a dedicated manner analogous to an ASIC. Therefore, the FPGA circuitry 600 may perform the operations corresponding to the some or all of the machine readable instructions of FIGS. 3A and 3B faster than the general purpose microprocessor can execute the same.

In the example of FIG. 6, the FPGA circuitry 600 is structured to be programmed (and/or reprogrammed one or more times) by an end user by a hardware description language (HDL) such as Verilog. The FPGA circuitry 600 of FIG. 6, includes example input/output (I/O) circuitry 602 to obtain and/or output data to/from example configuration circuitry 604 and/or external hardware (e.g., external hardware circuitry) 606. For example, the configuration circuitry 604 may implement interface circuitry that may obtain machine readable instructions to configure the FPGA circuitry 600, or portion(s) thereof. In some such examples, the configuration circuitry 604 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 606 may implement the microprocessor 500 of FIG. 5. The FPGA circuitry 600 also includes an array of example logic gate circuitry 608, a plurality of example configurable interconnections 610, and example storage circuitry 612. The logic gate circuitry 608 and interconnections 610 are configurable to instantiate one or more operations that may correspond to at least some of the machine readable instructions of FIGS. 3A and 3B and/or other desired operations. The logic gate circuitry 608 shown in FIG. 6 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 608 to enable configuration of the electrical structures and/or the logic gates to form circuits to perform desired operations. The logic gate circuitry 608 may include other electrical structures such as look-up tables (LUTs), registers (e.g., flip-flops or latches), multiplexers, etc.

The interconnections 610 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 608 to program desired logic circuits.

The storage circuitry 612 of the illustrated example is structured to store result(s) of the one or more of the operations performed by corresponding logic gates. The storage circuitry 612 may be implemented by registers or the like. In the illustrated example, the storage circuitry 612 is distributed amongst the logic gate circuitry 608 to facilitate access and increase execution speed.

The example FPGA circuitry 600 of FIG. 6 also includes example Dedicated Operations Circuitry 614. In this example, the Dedicated Operations Circuitry 614 includes special purpose circuitry 616 that may be invoked to implement commonly used functions to avoid the need to program those functions in the field. Examples of such special purpose circuitry 616 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 600 may also include example general purpose programmable circuitry 618 such as an example CPU 620 and/or an example DSP 622. Other general purpose programmable circuitry 618 may additionally or alternatively be present such as a GPU, an XPU, etc., that can be programmed to perform other operations.

Although FIGS. 5 and 6 illustrate two example implementations of the processor circuitry 412 of FIG. 4, many other approaches are contemplated. For example, as mentioned above, modern FPGA circuitry may include an on-board CPU, such as one or more of the example CPU 620 of FIG. 6. Therefore, the processor circuitry 412 of FIG. 4 may additionally be implemented by combining the example microprocessor 500 of FIG. 5 and the example FPGA circuitry 600 of FIG. 6. In some such hybrid examples, a first portion of the machine readable instructions represented by the flowchart of FIGS. 3A and 3B may be executed by one or more of the cores 502 of FIG. 5, a second portion of the machine readable instructions represented by the flowchart of FIGS. 3A and 3B may be executed by the FPGA circuitry 600 of FIG. 6, and/or a third portion of the machine readable instructions represented by the flowchart of FIGS. 3A and 3B may be executed by an ASIC. It should be understood that some or all of the circuitry of FIG. 4 may, thus, be instantiated at the same or different times. Some or all of the circuitry may be instantiated, for example, in one or more threads executing concurrently and/or in series. Moreover, in some examples, some or all of the circuitry of FIG. 4 may be implemented within one or more virtual machines and/or containers executing on the microprocessor.

In some examples, the processor circuitry 412 of FIG. 4 may be in one or more packages. For example, the processor circuitry 500 of FIG. 5 and/or the FPGA circuitry 600 of FIG. 6 may be in one or more packages. In some examples, an XPU may be implemented by the processor circuitry 412 of FIG. 4, which may be in one or more packages. For example, the XPU may include a CPU in one package, a DSP in another package, a GPU in yet another package, and an FPGA in still yet another package.

Figure 7:
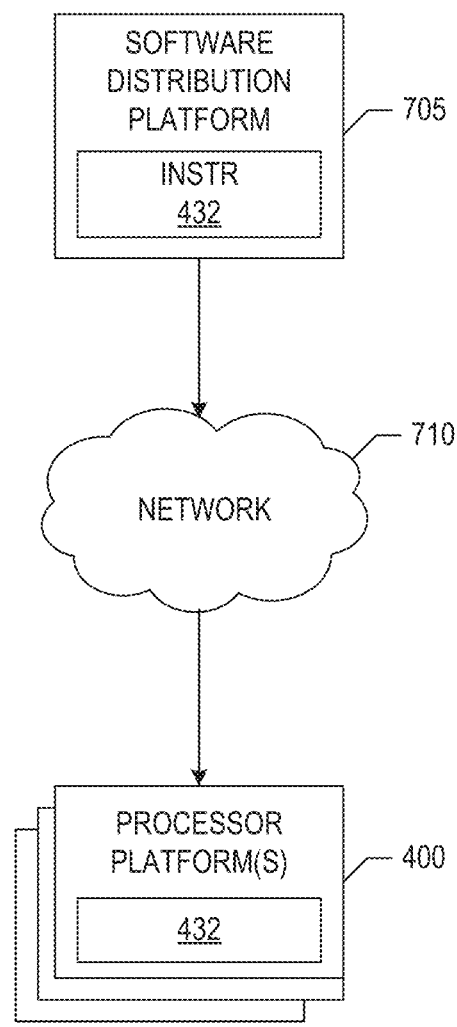
FIG. 7 is a block diagram of an example software distribution platform (e.g., one or more servers) to distribute software (e.g., software corresponding to the example machine readable instructions of FIGS. 3A and 3B) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 705 to distribute software such as the example machine readable instructions 432 of FIG. 4 to hardware devices owned and/or operated by third parties is illustrated in FIG. 7. The example software distribution platform 705 may be implemented by any computer server, data facility, cloud service, etc., capable of storing and transmitting software to other computing devices. The third parties may be customers of the entity owning and/or operating the software distribution platform 705. For example, the entity that owns and/or operates the software distribution platform 705 may be a developer, a seller, and/or a licensor of software such as the example machine readable instructions 432 of FIG. 4. The third parties may be consumers, users, retailers, OEMs, etc., who purchase and/or license the software for use and/or re-sale and/or sub-licensing. In the illustrated example, the software distribution platform 705 includes one or more servers and one or more storage devices. The storage devices store the machine readable instructions 432, which may correspond to the example machine readable instructions 300 of FIGS. 3A and 3B, as described above. The one or more servers of the example software distribution platform 705 are in communication with a network 710, which may correspond to any one or more of the Internet and/or any of the example networks 426 described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 432 from the software distribution platform 705. For example, the software, which may correspond to the example machine readable instructions 300 of FIGS. 3A and 3B, may be downloaded to the example processor platform 400, which is to execute the machine readable instructions 432 to implement the clock rate tuning circuitry 112. In some example, one or more servers of the software distribution platform 705 periodically offer, transmit, and/or force updates to the software (e.g., the example machine readable instructions 432 of FIG. 4) to ensure improvements, patches, updates, etc., are distributed and applied to the software at the end user devices.

From the foregoing, it will be appreciated that example systems, methods, apparatus, and articles of manufacture have been disclosed that provide for intelligent tuning or optimization of overclocking parameters to facilitate stable operation of a processing unit at increased clock rates. Examples disclosed herein use an optimization model to select (e.g., predict) values of overclocking parameters based on user-defined ranges for the values. Examples disclosed herein perform trials to evaluate the stability of the processing unit when operating based on the selected overclocking parameters and to refine the optimization model based on the performance of the processing unit. Examples disclosed herein account for feedback from a cooler of the system when evaluating performance of the processing unit. Examples disclosed herein penalize trials associated with values of overclocking parameters that caused the processing unit to become instable, thereby training the optimization model with respect to identifying optimal values for the overclocking parameters. Disclosed systems, methods, apparatus, and articles of manufacture improve the efficiency of using a computing device by providing an efficient, automated process for identifying values of overclocking parameters that increase a clock rate of the processing while facilitating performance stability. Disclosed systems, methods, apparatus, and articles of manufacture are accordingly directed to one or more improvement(s) in the operation of a machine such as a computer or other electronic and/or mechanical device.

Example apparatus, systems, methods, and articles of manufacture for intelligent tuning of overclocking frequency are disclosed herein. Further examples and combinations thereof include the following:

Example 1 includes an apparatus comprising trial control circuitry to execute an optimization model to select first values for overclocking parameters of a processor, the first values associated with a first trial; and perform benchmark testing of the processor when the processor is operating based on the first values; trial evaluation circuitry to calculate a first score for the first trial based on the benchmark testing; and model updating circuitry to perform a comparison of the first score to a second score, the second score associated with a second trial for second values for the overclocking parameters, the second values different than the first values; and select one of the first values or the second values to overclock the processor based on the comparison.

Example 2 includes the apparatus of example 1, wherein the model updating circuitry is to update the optimization model based on the first score to generate an updated optimization model.

Example 3 includes the apparatus of examples 1 or 2, wherein the trial control circuitry is to execute the updated optimization model to select third values for the overclocking parameters.

Example 4 includes the apparatus of any of examples 1-3, wherein the trial evaluation circuitry is to calculate the first score based on benchmark scores obtained from the benchmark testing.

Example 5 includes the apparatus of example 4, wherein the trial evaluation circuitry is to calculate the first score by averaging the benchmark scores.

Example 6 includes the apparatus of any of examples 1-5, wherein the trial evaluation circuitry is to detect a crash event of the processor during the benchmark testing; and calculate the first score by applying a penalty to one or more of the benchmark scores in response to the crash event, the one or more benchmark scores associated with a benchmark test that did not cause the crash event.

Example 7 includes the apparatus of any of examples 1-6, wherein the trial control circuitry is to perform the benchmark testing by repeating a benchmark test one or more times.

Example 8 includes the apparatus of any of examples 1-7, further including cooler monitoring circuitry to determine a temperature of the processor based on data from a cooler; and instruct the cooler to increase cooling of the processor to reduce the temperature of the processor prior to the benchmark testing.

Example 9 includes the apparatus of any of examples 1-8, wherein the overclocking parameters includes a first overclocking parameter and the first values includes a first value for the first overclocking parameter and further including component interface circuitry to retrieve a minimum value for the first overclocking parameter and a maximum value for the first overclocking parameter, the trial control circuitry to execute the optimization model to select the first value for the first overclocking parameter based on the minimum value and the maximum value.

Example 10 includes the apparatus of any of examples 1-9, wherein the first overclocking parameter includes one of a core voltage, a core ratio, or a temperature threshold.

Example 11 includes an apparatus comprising at least one memory; instructions in the apparatus; and processor circuitry to execute the instructions to: select a first set of overclocking parameter values and a second set of overclocking parameter values, the first set of overclocking parameter values different than the second set of overclocking parameter values; perform first benchmark testing based on the first set of overclocking parameter values; perform second benchmark testing based on the second set of overclocking parameter values; associate the first set of overclocking parameter values with a first score based on the first benchmark testing; associate the second set of overclocking parameter values with a second score based on the second benchmark testing; and select one of the first set of overclocking parameter values or the second set of overclocking parameter values to be used to increase a processor clock rate based on the first score and the second score.

Example 12 includes the apparatus of example 11, wherein the processor circuitry is to execute an optimization model to select the first set of overclocking parameter values.

Example 13 includes the apparatus of examples 11 or 12, wherein the processor circuitry is to update the optimization model based on the first set of overclocking parameter values.

Example 14 includes the apparatus of any of examples 11-13, wherein the processor circuitry is to select the first set of overclocking parameter values based on respective ranges defining minimum and maximum values for the overclocking parameter values.

Example 15 includes the apparatus of any of examples 11-14, wherein the processor circuitry is to calculate the first score based on an average of benchmark scores obtained from the first benchmark testing.

Example 16 includes the apparatus of any of examples 11-15, wherein the processor circuitry is to detect a processor crash event during the first benchmark testing; and calculate the first score based on benchmark scores obtained from the first benchmark testing and a penalty factor.

Example 17 includes the apparatus of any of examples 11-16, wherein the processor circuitry is to detect an operational status of a cooler prior to the performance of the first benchmark testing.

Example 18 includes a non-transitory computer readable storage medium comprising instructions that, when executed, cause a processor to at least execute a model to predict a first overclocking parameter value for the processor; perform first benchmark testing when the processor is operating based on the first overclocking parameter value; associate the first overclocking parameter value with a first score based on the first benchmark testing; train the model based on the first overclocking parameter value and the first score to generate an updated model; execute the updated model to predict a second overclocking parameter value for the processor, the first overclocking parameter value different than the second overclocking parameter value; perform second benchmark testing when the processor is operating based on the second overclocking parameter value; associate the second overclocking parameter value with a second score based on the second benchmark testing; and select one of the first overclocking parameter value or the second overclocking parameter value to be used to overclock the processor based on the first score and the second score.

Example 19 includes the non-transitory computer readable storage medium of example 18, wherein the instructions, when executed, cause the processor to train the updated model based on the second overclocking value and the second score.

Example 20 includes the non-transitory computer readable storage medium of examples 18 or 19, wherein the instructions, when executed, cause the processor to cause a performance metric of a cooler to be adjusted prior to performing the first benchmark testing.

Example 21 includes the non-transitory computer readable storage medium of any of examples 18-20, wherein the instructions, when executed, cause the processor to identify a minimum value for the first overclocking parameter value and a maximum value for the first overclocking parameter value based on a user input; and select the first overclocking parameter value based on the minimum value and the maximum value.

Example 22 includes the non-transitory computer readable storage medium of any of examples 18-21, wherein the instructions, when executed, cause the processor to perform the first benchmark testing by conducting a plurality of repeated benchmark tests when the processor is operating based on the first overclocking parameter value.

Example 23 includes an apparatus comprising means for interfacing to retrieve minimum values for respective overclocking parameters of a processor and maximum values for the respective overclocking parameters; means for controlling a first trial, the controlling means to execute an optimization model to select first values for the respective overclocking parameters; perform benchmark testing of the processor when the processor is operating based on the first values; means for evaluating to calculate a first score for the first trial based on the benchmark testing; and means for updating to perform a comparison of the first score to a second score, the second score associated with a second trial for a second values of the respective overclocking parameter, the second values different than the first values; and select one of the first values or second values to overclock the processor based on the comparison.

Example 24 includes the apparatus of example 23, wherein the updating means is to update the optimization model based on the first score to generate an updated optimization model.

Example 25 includes the apparatus of examples 23 or 24, wherein the controlling means is to execute the updated optimization model to select third values for the respective overclocking parameters.

Example 26 includes the apparatus of any of examples 23-25, wherein the evaluating means is to calculate the first score based on benchmark scores obtained from the benchmark testing.

Example 27 includes the apparatus of any of examples 23-26, wherein the evaluating means is to calculate the first score by averaging the benchmark scores.

Example 28 includes the apparatus of any of examples 23-27, wherein the evaluating means is to detect a crash event of the processor during the benchmark testing; and calculate the first score by applying a penalty to one or more of the benchmark scores in response to the crash event, the one or more benchmark scores associated with a benchmark test that did not cause the crash event.

Example 29 includes the apparatus of any of examples 23-28, further including means for monitoring to determine a temperature of the processor based on data from a cooler; and instruct the cooler to increase cooling of the processor prior to the benchmark testing.

Example 30 includes an apparatus to overclock a processor, the apparatus comprising interface circuitry to obtain a minimum value for an overclocking parameter and a maximum value for the overclocking parameter; and processor circuitry including one or more of at least one of a central processing unit, a graphic processing unit, or a digital signal processor, the at least one of the central processing unit, the graphic processing unit, or the digital signal processor having control circuitry to control data movement within the processor circuitry, arithmetic and logic circuitry to perform one or more first operations corresponding to instructions, and one or more registers to store a result of the one or more first operations, the instructions in the apparatus; a Field Programmable Gate Array (FPGA), the FPGA including logic gate circuitry, a plurality of configurable interconnections, and storage circuitry, the logic gate circuitry and interconnections to perform one or more second operations, the storage circuitry to store a result of the one or more second operations; or Application Specific Integrate Circuitry (ASIC) including logic gate circuitry to perform one or more third operations; the processor circuitry to perform at least one of the first operations, the second operations, or the third operations to instantiate trial control circuitry to execute an optimization model to select a first value for the overclocking parameter, the first value associated with a first trial; perform benchmark testing based on the first value; trial evaluation circuitry to calculate a first score for the first trial based on the benchmark testing; and model updating circuitry to perform a comparison of the first score to a second score, the second score associated with a second trial for a second value for the overclocking parameter, the second value different than the first value; and select one of the first value or second value to cause a processor clock rate to increase based on the comparison.

Example 31 includes a method comprising selecting a first set of overclocking parameter values and a second set of overclocking parameter values, the first set of overclocking parameter values different than the second set of overclocking parameter values; performing first benchmark testing based on the first set of overclocking parameter values; performing second benchmark testing based on the second set of overclocking parameter values; associating the first set of overclocking parameter values with a first score based on the first benchmark testing; associating the second set of overclocking parameter values with a second score based on the second benchmark testing; and selecting one of the first set of overclocking parameter values or the second set of overclocking parameter values to be used to increase a processor clock rate based on the first score and the second score.

Example 32 includes the method of example 31, wherein selecting the first set of overclocking parameter values includes executing an optimization model to select the first set of overclocking parameter values.

Example 33 includes the method of examples 31 or 32, further including updating the optimization model based on the selected one of the first set of overclocking parameter values or the second set of overclocking parameter values.

Example 34 includes the method of any of examples 31-33, further including selecting the first set of overclocking parameter values based on respective ranges defining minimum and maximum values for the overclocking parameter values.

Example 35 includes the method of any of examples 31-34, further including calculating the first score based on an average of benchmark scores obtained from the first benchmark testing.

Example 36 includes the method of any of examples 31-35, further including detecting a processor crash event during the first benchmark testing; and calculating the first score based on benchmark scores obtained from the first benchmark testing and a penalty factor.

Example 37 includes the method of any of examples 31-36, further including identifying an operational status of a cooler prior to the performing the first benchmark testing.

The following claims are hereby incorporated into this Detailed Description by this reference. Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

What is claimed is:

1. An apparatus comprising:
   machine-readable instructions; and
   at least one programmable circuit to instantiate:
      trial control circuitry to:
         execute an optimization model to select first values for overclocking parameters of one or more of the at least one programmable circuit, the first values associated with a first trial; and
         perform benchmark testing of the one or more of the at least one programmable circuit when the one or more of the at least one programmable circuit is operating based on the first values;
      trial evaluation circuitry to:
         assign benchmark scores to respective tests of the benchmark testing of the first trial;
         identify at least one of the tests as associated with a crash event;
         responsive to the crash event, apply a penalty to one or more of the benchmark scores corresponding to a test not associated with the crash event to calculate a first score for the first trial based on the benchmark testing; and
      model updating circuitry to:
         perform a comparison of the first score to a second score, the second score associated with a second trial for second values for the overclocking parameters, the second values different than the first values; and
         select one of the first values or the second values to overclock the one or more of the at least one programmable circuit based on the comparison.

2. The apparatus of claim 1, wherein the model updating circuitry is to update the optimization model based on the first score to generate an updated optimization model.

3. The apparatus of claim 2, wherein the trial control circuitry is to execute the updated optimization model to select third values for the overclocking parameters.

4. The apparatus of claim 1, wherein one or more of the at least one programmable circuit is to instantiate cooler monitoring circuitry to:
   determine a temperature of the one or more of the at least one programmable circuit prior to the benchmark testing based on data from a cooler; and
   instruct the cooler to increase cooling of the one or more of the at least one programmable circuit to reduce the temperature of the one or more of the at least one programmable circuit prior to the benchmark testing.

5. The apparatus of claim 1, wherein the overclocking parameters includes a first overclocking parameter, the first values include a first value for the first overclocking parameter, and one or more of the at least one programmable circuit is to instantiate component interface circuitry to obtain a minimum value for the first overclocking parameter and a maximum value for the first overclocking parameter, the trial control circuitry to execute the optimization model to select the first value for the first overclocking parameter based on the minimum value and the maximum value.

6. The apparatus of claim 5, wherein the first overclocking parameter includes one of a core voltage, a core ratio, or a temperature threshold.

7. The apparatus of claim 1, wherein the at least one of the tests associated with the crash event includes a first test and the trial evaluation circuitry is to:
   identify a second test as associated with a performance event at a cooler; and
   apply the penalty to one or more of the benchmark scores corresponding to a test not associated with the crash event and not associated with the performance event at the cooler.

8. An apparatus comprising:
   at least one memory;
   machine-readable instructions; and
   at least one processor circuit to be programmed by the machine-readable instructions to:
      select a first set of overclocking parameter values and a second set of overclocking parameter values, the first set of overclocking parameter values different than the second set of overclocking parameter values;
      perform first benchmark testing based on the first set of overclocking parameter values;
      perform second benchmark testing based on the second set of overclocking parameter values;
      associate respective benchmark runs of the first benchmark testing with corresponding first benchmark scores;
      calculate a first score for the first set of overclocking parameter values based on the first benchmark scores and a penalty factor, the penalty factor associated with a processor crash event;
      associate respective benchmark runs of the second benchmark testing with corresponding second benchmark scores;
      calculate a second score for the second set of overclocking parameter values based on the second benchmark scores; and
      select one of the first set of overclocking parameter values or the second set of overclocking parameter values to be used to increase a processor clock rate based on the first score and the second score.

9. The apparatus of claim 8, wherein one or more of the at least one processor circuit is to execute an optimization model to select the first set of overclocking parameter values.

10. The apparatus of claim 9, wherein one or more of the at least one processor circuit is to update the optimization model based on the first set of overclocking parameter values.

11. The apparatus of claim 8, wherein one or more of the at least one processor circuit is to select the first set of overclocking parameter values based on respective ranges defining minimum and maximum values for the overclocking parameter values.

12. The apparatus of claim 8, wherein one or more of the at least one processor circuit is to calculate the first second score based on an average of the second benchmark scores.

13. The apparatus of claim 8, wherein one or more of the at least one processor circuit is to detect an operational status of a cooler prior to the performance of the first benchmark testing.

14. A non-transitory computer readable storage medium comprising machine-readable instructions to cause at least one processor circuit to at least:
    execute a model to predict a first overclocking parameter value for one or more of the at least one processor circuit;
    perform first benchmark testing of the one or more of the at least one processor circuit operated based on the first overclocking parameter value, the performance of the first benchmark testing including a plurality of repeated benchmark tests associated with operation based on the first overclocking parameter value;
    assign benchmark scores to respective ones of the repeated benchmark tests;
    generate a penalized benchmarking score by applying a penalty based on a performance event to one or more of the benchmark scores corresponding to a benchmark test not associated with the performance event;
    initiate re-training of the model based on the first overclocking parameter value and the penalized benchmarking score to generate an updated model;
    execute the updated model to predict a second overclocking parameter value, the first overclocking parameter value different than the second overclocking parameter value;
    perform second benchmark testing based on the second overclocking parameter value;
    associate the second overclocking parameter value with a second score based on the second benchmark testing; and
    select one of the first overclocking parameter value or the second overclocking parameter value to cause overclocking based on the first penalized benchmarking score and the second score.

15. The non-transitory computer readable storage medium of claim 14, wherein the machine-readable instructions are to cause one or more of the at least one processor circuit to train the updated model based on the second overclocking parameter value and the second score.

16. The non-transitory computer readable storage medium of claim 14, wherein the machine-readable instructions are to cause one or more of the at least one processor circuit to cause a performance metric of a cooler to be adjusted prior to performing the first benchmark testing.

17. The non-transitory computer readable storage medium of claim 14, wherein the machine-readable instructions are to cause one or more of the at least one processor circuit to:
    identify a minimum value for the first overclocking parameter value and a maximum value for the first overclocking parameter value based on a user input; and
    select the first overclocking parameter value based on the minimum value and the maximum value.

18. The non-transitory computer readable storage medium of claim 14, wherein the performance event includes a processor crash event or performance of a benchmark test of the first benchmark testing exceeding a threshold time.

19. The non-transitory computer readable storage medium of claim 14, wherein the machine-readable instructions are to cause one or more of the at least one processor circuit to:
    identify a rotational frequency of a fan of a cooler during a first one of the benchmark tests of the first benchmark testing;
    determine that the rotational frequency exceeds a threshold rotational frequency; and
    responsive to the rotational frequency exceeding the threshold rotational frequency, identify the first one of the benchmark tests as associated with the performance event.

20. The non-transitory computer readable storage medium of claim 14, wherein the machine-readable instructions are to cause one or more of the at least one processor circuit to:
    detect an increase in temperature of the one or more of the least one processor circuit during a first one of the benchmark tests of the first benchmark testing;
    identify a time for a temperature of the one or more of the at least one processor circuit to be reduced via a cooler during the first one of the tests;
    determine that the time for the temperature of the one or more of the at least one processor circuit to be reduced exceeds a threshold time; and
    responsive to the time exceeding the time threshold, identify the first one of the benchmark tests as associated with the performance event.

* * * * *

UNITED STATES PATENT AND TRADEMARK OFFICE
CERTIFICATE OF CORRECTION

| | | |
|---|---|---|
| PATENT NO. | : 12,416,938 B2 | Page 1 of 1 |
| APPLICATION NO. | : 17/558118 | |
| DATED | : September 16, 2025 | |
| INVENTOR(S) | : Yan et al. | |

It is certified that error appears in the above-identified patent and that said Letters Patent is hereby corrected as shown below:

In the Claims

Column 31, [Claim 12], Line 11, Delete: "first"

Column 31, [Claim 14], Line 50, Delete: "first"

Signed and Sealed this
Fourth Day of November, 2025

John A. Squires
*Director of the United States Patent and Trademark Office*